(12) United States Patent
Leibman et al.

(10) Patent No.: US 9,740,562 B2
(45) Date of Patent: Aug. 22, 2017

(54) METHOD FOR CHECKPOINTING AND RESTORING PROGRAM STATE

(75) Inventors: Stephen Leibman, Medford, MA (US); Jonathon Michael Stall, Bothell, WA (US); Parry Jones Reginald Husbands, Waltham, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 509 days.

(21) Appl. No.: 12/972,792

(22) Filed: Dec. 20, 2010

(65) Prior Publication Data

US 2012/0159462 A1    Jun. 21, 2012

(51) Int. Cl.
*G06F 9/44* (2006.01)
*G06F 9/45* (2006.01)
*G06F 11/14* (2006.01)
*G06F 11/36* (2006.01)
*G06F 9/46* (2006.01)

(52) U.S. Cl.
CPC ...... *G06F 11/1438* (2013.01); *G06F 11/3636* (2013.01); *G06F 9/461* (2013.01); *G06F 11/3664* (2013.01)

(58) Field of Classification Search
CPC . G06F 8/41; G06F 8/447; G06F 8/443; G06F 9/45516; G06F 11/362; G06F 11/3636; G06F 11/3648; G06F 11/3676; G06F 11/14–11/1407; G06F 11/1438; G06F 9/461; G06F 11/3664
See application file for complete search history.

(56) References Cited

U.S. PATENT DOCUMENTS

| | | | |
|---|---|---|---|
| 6,044,475 A | 3/2000 | Chung et al. | |
| 6,154,877 A | 11/2000 | Ramkumar et al. | |
| 6,161,219 A | 12/2000 | Ramkumar et al. | |
| 6,256,751 B1 | 7/2001 | Meth et al. | |
| 6,631,514 B1 * | 10/2003 | Le | G06F 9/30174 712/E9.037 |
| 6,708,288 B1 * | 3/2004 | Ziegler et al. | 714/15 |
| 6,766,471 B2 | 7/2004 | Meth | |
| 6,874,138 B1 * | 3/2005 | Ziegler | G06F 11/1489 714/38.13 |
| 7,206,964 B2 | 4/2007 | Moser et al. | |
| 7,240,334 B1 * | 7/2007 | Fluke | G06F 11/3636 710/52 |
| 7,536,591 B2 | 5/2009 | Varadarajan et al. | |
| 7,634,687 B2 | 12/2009 | Haselden et al. | |
| 7,669,081 B2 | 2/2010 | Lett et al. | |
| 7,673,181 B1 | 3/2010 | Lindo et al. | |

(Continued)

OTHER PUBLICATIONS

Raphael Y. de Camargo, Checkpointing-based Rollback Recovery for Parallel Applications on the InteGrade Grid Middleware, 2004, pp. 1-6.*

(Continued)

*Primary Examiner* — Thuy Dao
*Assistant Examiner* — Mongbao Nguyen
(74) *Attorney, Agent, or Firm* — Fiala & Weaver P.L.L.C.

(57) ABSTRACT

Techniques are described that enable restoring interrupted program execution from a checkpoint without the need for cooperation from the computer's operating system. These techniques can be implemented by modifying existing code using an automated tool that adds instructions for enabling restoring interrupted program execution.

20 Claims, 5 Drawing Sheets

(56) References Cited

U.S. PATENT DOCUMENTS

| | | | | |
|---|---|---|---|---|
| 7,814,309 | B1* | 10/2010 | Truong | 713/153 |
| 8,291,383 | B1* | 10/2012 | Evans | G06F 11/3636 |
| | | | | 717/124 |
| 9,286,109 | B1* | 3/2016 | Backensto | G06F 9/461 |
| 2003/0088807 | A1* | 5/2003 | Mathiske et al. | 714/6 |
| 2004/0015883 | A1* | 1/2004 | Hundt | G06F 11/3612 |
| | | | | 717/131 |
| 2004/0260678 | A1 | 12/2004 | Verbowski et al. | |
| 2005/0034014 | A1* | 2/2005 | Moser et al. | 714/17 |
| 2005/0257090 | A1* | 11/2005 | Santos et al. | 714/35 |
| 2006/0156157 | A1 | 7/2006 | Haselden et al. | |
| 2006/0206873 | A1* | 9/2006 | Argade | G06F 11/3664 |
| | | | | 717/135 |
| 2007/0006047 | A1* | 1/2007 | Zhou | G06F 11/3636 |
| | | | | 714/38.1 |
| 2008/0052695 | A1* | 2/2008 | Dickenson | G06F 8/436 |
| | | | | 717/151 |
| 2008/0086730 | A1* | 4/2008 | Vertes | G06F 11/1438 |
| | | | | 718/100 |
| 2008/0282232 | A1* | 11/2008 | Cong | G06F 11/3404 |
| | | | | 717/127 |
| 2009/0089610 | A1* | 4/2009 | Rogers | G06F 11/1469 |
| | | | | 714/5.1 |
| 2009/0094582 | A1* | 4/2009 | Craft | G06F 9/4862 |
| | | | | 717/127 |
| 2009/0132853 | A1* | 5/2009 | Ferren et al. | 714/19 |
| 2009/0183027 | A1* | 7/2009 | Subhraveti | G06F 9/461 |
| | | | | 714/13 |
| 2009/0183181 | A1* | 7/2009 | Subhraveti | G06F 9/4856 |
| | | | | 719/320 |
| 2009/0254888 | A1* | 10/2009 | Nicholls | G06F 11/3664 |
| | | | | 717/129 |
| 2009/0282386 | A1* | 11/2009 | Moir | G06F 9/466 |
| | | | | 717/106 |
| 2010/0153776 | A1* | 6/2010 | Vick | G06F 9/30123 |
| | | | | 714/15 |
| 2010/0169895 | A1* | 7/2010 | Dice et al. | 719/312 |
| 2010/0199128 | A1* | 8/2010 | Coppinger | G06F 11/1438 |
| | | | | 714/19 |
| 2010/0218167 | A1* | 8/2010 | Turner | G06F 21/629 |
| | | | | 717/120 |
| 2010/0262812 | A1* | 10/2010 | Lopez et al. | 712/228 |
| 2010/0293532 | A1* | 11/2010 | Andrade | G06F 11/1438 |
| | | | | 717/140 |
| 2011/0066831 | A1* | 3/2011 | Blundell et al. | 712/228 |
| 2011/0126176 | A1* | 5/2011 | Kandasamy et al. | 717/130 |

OTHER PUBLICATIONS

Jooyong Lee, A Case for Dynamic Reverse-code Generation to Debug Non-deterministic Programs, 2006, pp. 1-13.*

Julia L. Lawall, Efficient Incremental Checkpointing of Java Programs, 2000, pp. 1-10.*

Lukasz Ziarek, Stabilizers: A Modular Checkpointing Abstraction for Concurrent Functional Programs, 2006, pp. 1-12.*

Guoqing Xu, Efficient Checkpointing of Java Software Using Context-Sensitive Capture and Replay, 2007, pp. 1-10.*

"Berkeley Lab Checkpoint/Restart (BLCR)," Oct. 11, 2010 (Retrieved Date), Future Technologies Group, Berkeley Lab Computing Sciences, Berkeley, California, 4 pages.

S. H. Russ, J. Robinson and M. Gleeson, "Dynamic Multimethod Communication between Clusters of Workstations," *Parallel Computing*, Oct. 11, 2010 (Retrieved Date), NSF Engineering Research Center for Computational Field Simulation, Mississippi State University, 23 pages.

J. Srouji, P. Schuster, M. Bach and Y. Kuzmin, "A Transparent Checkpoint Facility On NT," *Proceedings of the 2$^{nd}$ USENIX Windows NT Symposium*, Aug. 3-4, 1998, Seattle, Washington, 10 pages.

H. Zhong and J. Nieh, "CRAK: Linux Checkpoint/Restrart As a Kernel Module," Network Computing Lab, Department of Computer Science, Columbia University, Nov. 2001, 16 pages.

"International Search Report", Mailed Date—Aug. 31, 2012, Application No. PCT/US2011/066280, Filed Date—Dec. 20, 2011, pp. 10.

"Search Report Issued in European Patent Application No. 11851108.8", Mailed Date: Jun. 11, 2014, 7 Pages.

"First Office Action and Search Report Issued in Chinese Patent Application No. 201110428259.2", Mailed Date: Jan. 8, 2014, 12 Pages "Second Office Action Issued in Chinese Patent Application No. 201110428259.2", Mailed Date: Jun. 6, 2014, 7 Pages "Third Office Action and Search Report Issued in Chinese Patent Application No. 201110428259.2", Mailed Date: Sep. 10, 2014, 12 Pages.

* cited by examiner

METHOD FOR CHECKPOINTING AND RESTORING PROGRAM STATE

BACKGROUND OF THE INVENTION

1. Field of Invention

The techniques described herein relate to enabling the restoration of execution of a computer process from a point of interruption.

2. Discussion of the Related Art

Program crashes are known to occur in which an application or other computer program terminates unexpectedly or ceases to operate as designed. Some programs save information from time to time so that, when a crash occurs, the amount of data loss can be limited. For example, some word processing programs automatically save drafts of a document at various times as a user works on the document. If the word processing program crashes, the user may be able to restore the document by loading saved data from the most recent point at which the document was automatically saved by the word processing program.

Some operating systems provide the capability of receiving information from a program as it is running and can restore execution of the program from a saved state. However, in such techniques, cooperation from the operating system is required to allow the execution of the program to be restored.

SUMMARY

As discussed above, some existing techniques for restoring execution of a program from a point of interruption require cooperation from the operating system. Such techniques require the operating system to provide an interface suitable for saving application data and restoring the state of operation of an application when execution is interrupted. However, not all operating systems provide such capabilities. It would be advantageous to provide the capability of restoring execution of a program at the application level without requiring cooperation from the operating system.

Some applications have been specifically designed and programmed to include the capability of saving program data and restoring program data when execution is interrupted. However, it would be time consuming for an application programmer to have to design and program an application to provide such capabilities when a new application is written or an existing application is modified.

The techniques described herein provide a flexible framework at the program level for enabling the checkpointing and restoration of program execution. The Applicants have developed techniques for restoring program execution from the point at which execution was interrupted without the need for cooperation from the computer's operating system. These techniques can be implemented at the program level regardless of the operating system environment in which the program is running. In some embodiments, code for implementing these techniques can be incorporated into existing program code using an automated tool that modifies the program and adds instructions for enabling restoring interrupted program execution. Thus, a programmer developing an application does not need to design or program the application code to include such features, as code for enabling restoring interrupted program execution can be automatically incorporated using the automated tool.

Some embodiments relate to a method, comprising: receiving first computer readable instructions configured to control a microprocessor to perform one or more operations; using a microprocessor, generating second computer readable instructions based on the first computer readable instructions, the second computer readable instructions being configured to perform the one or more operations and to resume execution of a function from a checkpoint by calling the function; loading data for use by the function, the data having been saved at the checkpoint during a prior execution of the function; and skipping a portion of the function that was executed during the prior execution of the function before reaching the checkpoint. Some embodiments relate to a computer readable storage medium having stored thereon instructions which, when executed, perform the above-described method.

Some embodiments relate to a system comprising: a computer readable storage medium having stored thereon computer readable instructions configured to resume execution of function from a checkpoint by calling the function; loading data for use by the function, the data having been saved at the checkpoint during a prior execution of the function; skipping a portion of the function that was executed during the prior execution of the function before reaching the checkpoint; saving data used by the function; and tracking a program stack of a program comprising the function. The system also includes at least one microprocessor configured to execute the computer readable instructions.

The foregoing is a non-limiting summary of some embodiments.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the invention.

DETAILED DESCRIPTION

Figure 1:
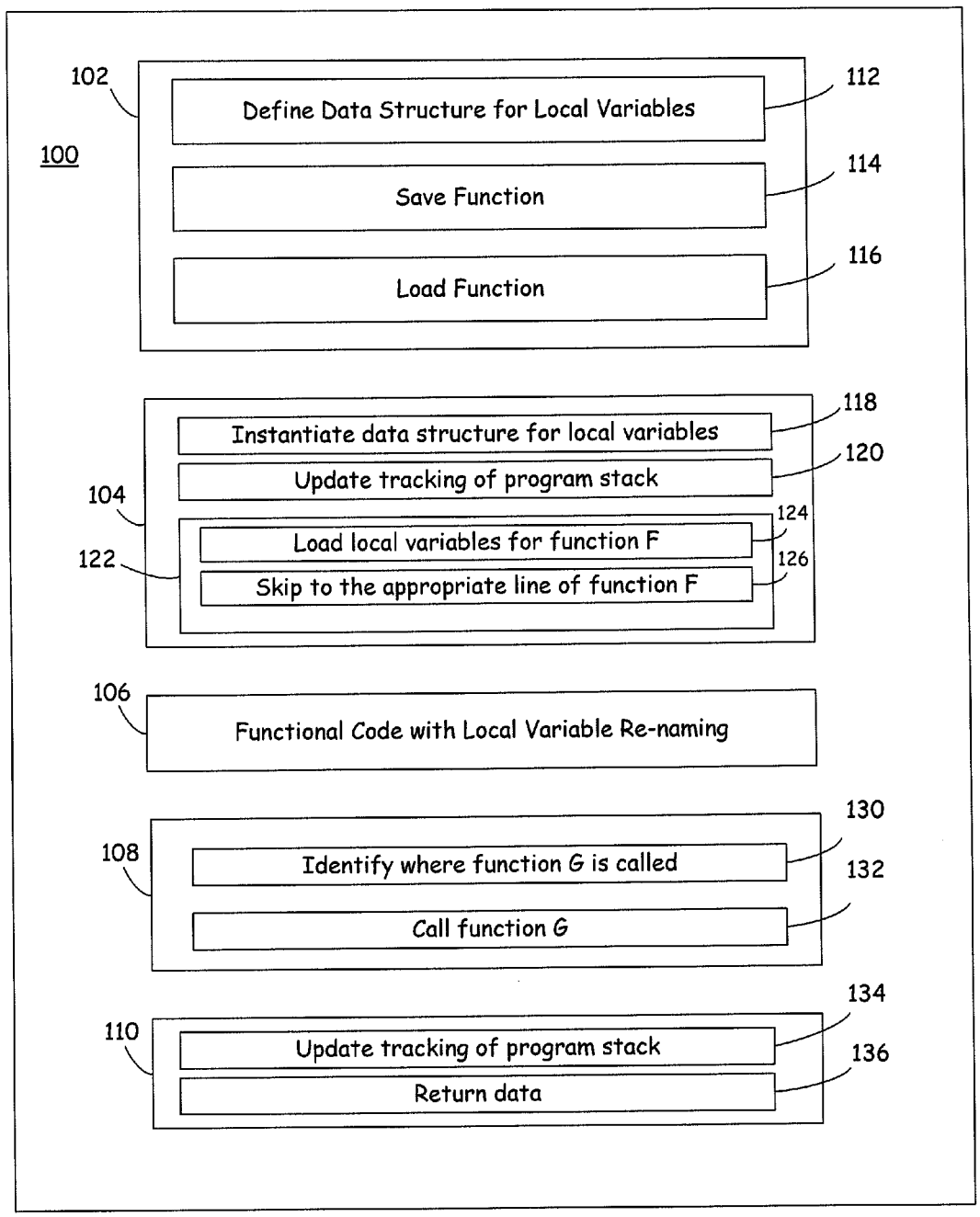
FIG. 1 shows a diagram of a software module that includes computer-readable instructions for performing operations as part of a function F of a computer program, according to some embodiments.

As discussed above, the techniques described herein enable restoring program execution from a checkpoint when execution is interrupted, without the need for cooperation from the computer's operating system. Such techniques can protect against instability in the underlying hardware or software, and can enable restoring program execution after an operating system crash, power failure, or other failure in the system. These techniques can be implemented by modifying existing code using an automated tool without requiring a programmer to program the application specifically to include this functionality. In some embodiments, a compiler or other program translation tool can re-configure existing code to provide the capability of saving and restoring execution of the program after an error occurs.

Advantageously, these techniques can be robust in a multithreaded, multicore environment and for an environment in which a program runs on multiple machines. When execution is interrupted and is unable to continue, programs can continue execution on a different processor or a different machine, even on a machine that is running a different operating system. These techniques can be used advantageously in a cloud computing environment in which multiple machines are available to execute a program. A detailed discussion of an exemplary embodiment is provided hereafter.

I. Example of Modifying Program Code to Support Restoring Execution

Commonly-used program languages provide the capability of defining functions that may be called during execution of a program. Code defines key aspects of the function, such as the inputs that the function accepts, the operations performed by the function, and the data returned by the function.

For example, the following code defines functions F and G. Function F receives integers a and b as input. Function F initializes a local variable x to be an integer that is set equal to the product a·b and initializes variable y to be an integer that is set equal to the return value of function G. Function F returns an integer having the value x+y. Function G receives integers x and b as inputs which correspond to local variables a and b within function G, respectively. Function G initializes a local variable x to be an integer that is set equal to a+b. Function G returns an integer equal to the value of x.

```
int F(int a, int b)
{
    int x = a*b;
    int y = G(x,b);
    return x+y;
}
int G(int a, int b)
{
    int x = a+b;
    return x;
}
```

When a program is run, function F can be called which then calls function G. If the program crashes or execution otherwise is interrupted during the execution of function F and/or G, the progress made in executing functions F and/or G can be lost. To continue execution, the program needs to be re-started and function F needs to be started again from the beginning, and then function G needs to be called again. Although the amount of processing power needed to execute exemplary functions F and G may not be large, it should be appreciated that, when executing a complex program, significant data may be lost and significant processing may need to be performed a second time to reach the point at which the execution of functions F and/or G was interrupted. The amount of lost work can be particularly significant when executing complex programming tasks such as modeling and simulation, for example.

In some embodiments, additional code can be inserted into a program to enable storing the state of operation of the program at various points, called "checkpoints." Code can be included for tracking the program stack by saving an indication as to which functions are running. Code can also be included for storing local variables used by the functions and for saving an indication of the line within a function that has been reached in execution. The addition of these types of code can enable re-building the program by calling one or more functions that were in operation at the checkpoint, loading local variables that were in use by the function(s), and skipping the portion of the function(s) already executed prior to interruption.

FIG. 1 shows an example of a software module 100 that includes computer-readable instructions for performing operations of function F of a computer program and for enabling restoring program execution. The computer readable instructions of software module 100 enable tracking the state of execution of the function within the program, saving data used by the function at various checkpoints during program execution, and restoring execution of the function from a checkpoint when the program is interrupted. In the example of FIG. 1, software module 100 includes helper code 102, a function preamble 104, functional code 106 for performing the operations of function F, call site label code 108, and a function epilogue 110.

Helper code 102 can include code 112 that defines a data structure for saving the local variables and input arguments of function F. Helper code 102 can also include code 114 that defines a save function for saving data for function F and code 116 that defines a load function for loading data for function F from storage. The save function appends the saved variables to a checkpoint file. The load function loads the variables from the current point in the checkpoint file and advances the file pointer. Although shown as source code for purposes of illustrating the concept, it should be appreciated that helper code 102 and any other code described herein may be implemented as object code, or any other suitable type of code. An example of helper code 102 suitable for defining a data structure and providing save and load functions is shown below.

```
struct F_Locals : Locals
{
    // local variables
    int x;
    int y;
    // input arguments
    int a;
    int b;
    virtual void Save( )
    {
        g_pCheckpoint->SaveLocals(this);
    };
    virtual void Load( )
    {
        g_pCheckpoint->LoadLocals(this);
    }
};
// Base frame structure from which function-specific versions derive
struct Locals
{
    virtual void Save( ) = 0;
    virtual void Load( ) = 0;
    int _CallSite;
    // Next structure. This is used to preserve ordering of stack frames in the example implementation,
    // but any of several alternative solutions can be used for this, as appropriate.
    Locals * m_pNext;
};
```

As shown in FIG. 1, function preamble 104 can include code 118 that instantiates a data structure object for the local variables of function F and code 120 for tracking the program stack by saving an indication that function F is being executed using the push( ) function. Function preamble 104 can also include code 122 capable of rebuilding the execution of function F from a checkpoint. If the execution of function F is being rebuilt, code 124 is executed to load the local variables for function F that were saved at the checkpoint. Code 126 is executed to skip a portion of function F that was already executed before reaching the checkpoint. For example, if function G was in execution within the scope of function F when execution of the program was interrupted, code 126 can skip to the line of function F that calls function G. An example of a functional preamble 104 that may be used in some embodiments is shown below.

```
int F(int a, int b)
{
        F_Locals l;
    Push(&l);
    // Checkpointing
    if (g_RebuildMode)
    {
        // Deserialize locals from checkpoint
        l.Load( );
        // Jump to proper line
        int i = l._CallSite;
        switch(i) {
            case 1: goto FunctionCall1;   //where G
        }                                 // is called
}
```

As shown in FIG. 1, functional code 106 is included for performing the operations of a function, e.g., function F. Although function F is discussed by way of example, the techniques described herein can be used for any function performing one or more operations of a computer program. Functional code 106 can be re-written from that of the original function, e.g., function F, so that local variables are stored in the data structure defined by code 112 to facilitate saving of data during execution so that the variables can be loaded later if it is necessary to re-build the execution of function F. An example of functional code 106 for use in some embodiments is shown below.

l.x=a*b;

As discussed above with respect to function F, the variable x is set equal to the product a·b. In functional code 106, the same multiplication operation is performed as in function F, but the code is modified so that the result is stored in the data structure defined by code 112 to facilitate re-loading the local variable if the function needs to be re-built.

As shown in FIG. 1, call site label code 130 can include code identifying where other functions are called within function F. For example, function F may call another function G, and call site label code 130 can identify the location within function F where function G is called. Code 132 is also included in function F for calling function G. An example of call site label code 130 for use in some embodiments is shown below.

```
FunctionCall1:
    l._CallSite = 1;
    l.y = G(l.x,b);
```

At this point, additional functional code 106 may be included, such as the following, which is executed to calculate the sum of variables x and y, as in function F above.

int temp=l.x+l.y;

As shown in FIG. 1, function epilogue 110 can include code 134 for updating tracking of the program stack using the pop( ) function when the execution of function F is to be completed. Function epilogue 110 can also include code 136 for returning data by function F. An example of a function epilogue 110 that may be used in some embodiments is shown below.

```
    Pop( );
    return temp;
}
```

Sample implementations of Push( ) and Pop( ) are shown below, by way of example.

```
Locals * g_pStack = NULL;
void Push(Locals * pNewFrame)
{
    pNewFrame->m_pNext = g_pStack;
    g_pStack = pNewFrame;
}
void Pop( )
{
    Locals * pTop = g_pStack;
    g_pStack = pTop->m_pNext;
    pTop->m_pNext = NULL;
}
```

The following code defines an example of a "Checkpoint" class which has the implementations of LoadLocals( ) and SaveLocals( ) which are in turn used by the Load( ) and Save( )methods of the "Locals" objects.

```
// False if running normally. True if rebuilding the stack from a check
point.
bool g_RebuildMode = false;
class Checkpoint
{
public:
    Checkpoint( )
    {
        idx = 0;
    }
    //
    // Helpers for reading a checkpoint
    //
    // Copy locals out of checkpoint into the data structure
    template<class T>
    void LoadLocals(T * p)
    {
        Locals * pNext = (Locals*) p;
        int cb = sizeof(T);
        memcpy(p, &pBuffer[idx], cb); // Alternatively, read from
persistent storage at this step.
        ((Locals*)p)->m_pNext = pNext;
        idx+= cb;
    };
    //
    // Helpers for creating a checkpoint
    //
    template<class T>
    void SaveLocals(T * p)
    {
        int cb = sizeof(T);
        memcpy(&pBuffer[idx], p, cb); // Alternatively, write directly
to persistent storage at this step.
        idx+= cb;
    };
```

-continued

```
    void Done( )
    {
        idx = 0;
    }
private:
    int idx;
    BYTE pBuffer[1000]; // For example purposes, a buffer in memory is
used. Can be replaced with allocation of persistent storage.
};
Checkpoint * g_pCheckpoint = NULL;
```

II. Example of Saving Program State at Checkpoints

Figure 2:
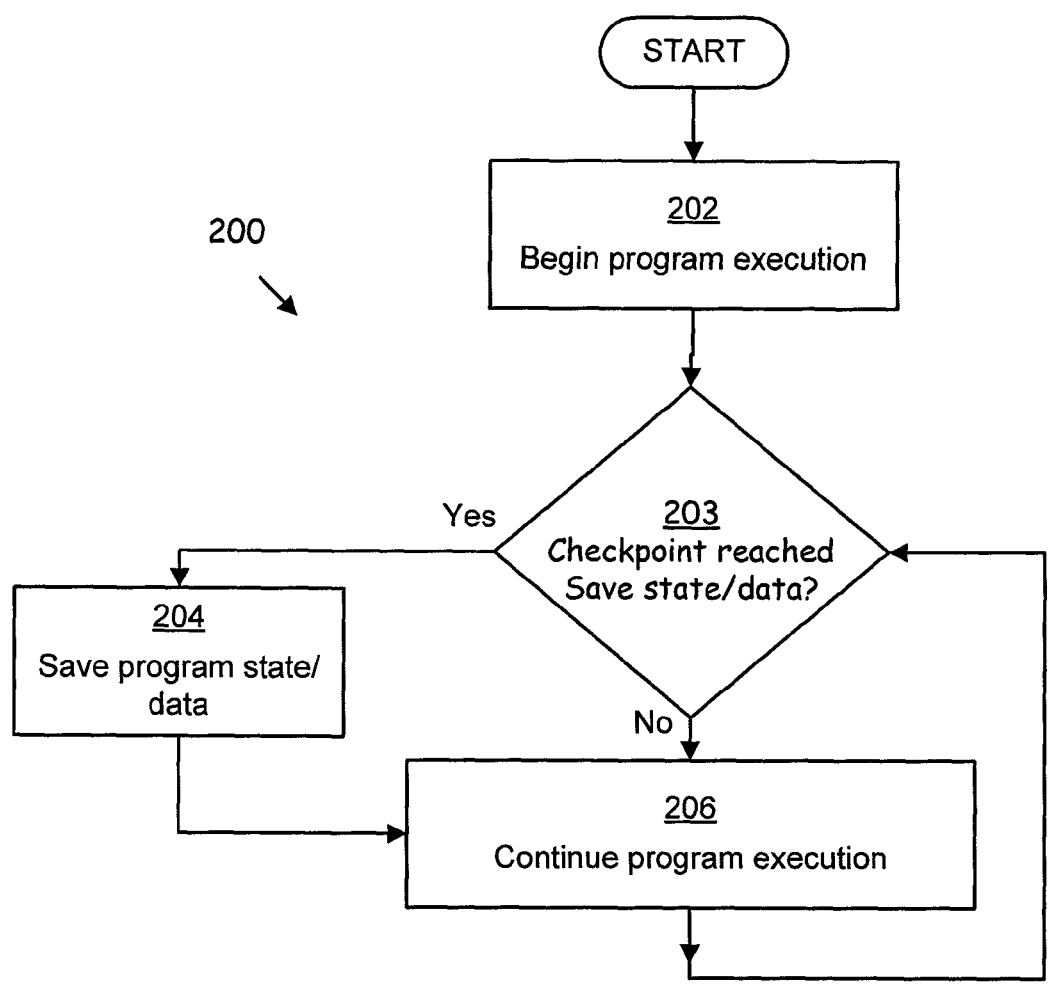
FIG. 2 shows a flowchart of a method of executing a program that includes saving the program state and program data at various checkpoints, according to some embodiments.

FIG. 2 shows an example of a method 200 of executing a program and saving the program state at various checkpoints. To save the program state, the stack of locals objects can be traversed and each one can be saved in turn. Execution of the program begins at step 202. At step 203, a checkpoint opportunity is reached at which the program has the option of saving the state of the program. The program can make a determination at step 203 as to whether to make use of the checkpoint opportunity to save the program state. The decision as to whether the program uses the checkpoint opportunity can be made based upon the amount of time that has elapsed since the last checkpoint, or any other suitable criteria. In some cases, the user may explicitly request a checkpoint. There is a tradeoff between the frequency of saving the program state and the performance of the program. Increasing the frequency at which the program state is saved can limit the amount of data loss, but can cause decreased program performance. The frequency with which checkpoint opportunities are taken can vary depending on the application.

If the program decides to use the checkpoint opportunity to save the program state, this information is saved in step 204. For example, the program may use the save function defined by code 114 in helper code 102. If the program decides not to use the checkpoint opportunity, execution of the program continues in step 206. Execution of the program continues until the next checkpoint is reached, at which point the method returns to the next checkpoint opportunity at step 203. Method 200 can continue until the program is terminated.

III. Example of Restoring Program Execution from a Checkpoint

Figure 3:
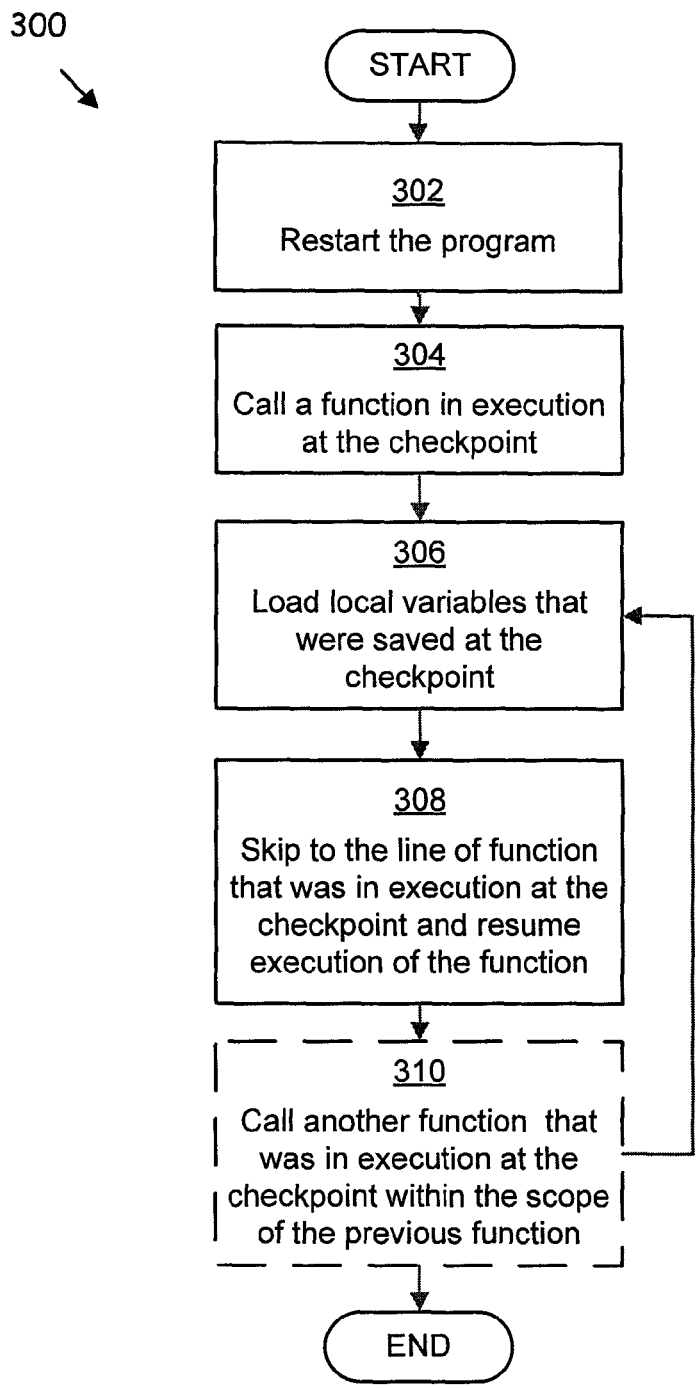
FIG. 3 shows a flowchart of a method of re-building the execution of a function from a checkpoint, according to some embodiments.

FIG. 3 shows a method 300 of restoring the execution of a function from a checkpoint, according to some embodiments. In step 302, the program is re-started after a crash or other failure has occurred. In step 304, the program calls a first function, such as function F discussed above. The local variables for function F that were saved at the checkpoint are loaded from storage in step 306. In step 308, the program skips to the line of function F that was in execution at the checkpoint, and execution of function F is resumed from that point. Thus, steps 306 and 308 facilitate restoring the execution of function F to the point of execution when the program state was saved at the checkpoint. If function G was in execution at the checkpoint, the program can skip to the line of function F that calls function G, and then function G is called in step 310. Steps 306 and 308 are then repeated for function G. The local variables for function G that were saved at the checkpoint are loaded from storage, and the program skips to the line of function G that was in execution at the checkpoint. If no other functions were in execution within the scope of the previous function, the method ends and program execution continues from the checkpoint. Thus, execution of the program can resume from the checkpoint without requiring re-executing all of the operations that were executed before the checkpoint was reached, prior to interruption of the program.

Figure 4:
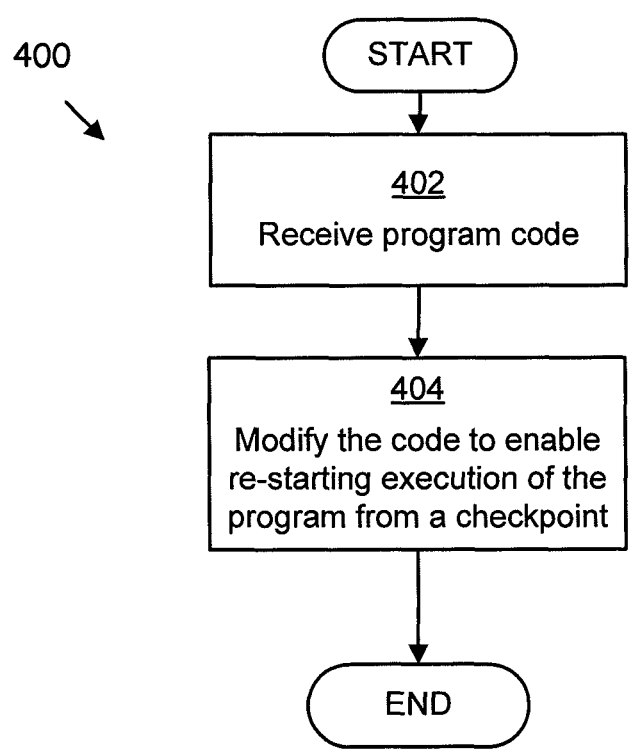
FIG. 4 shows a flowchart of a method of modifying code to enable restoring operation of a program from a checkpoint, according to some embodiments.

IV. Generating Code Enabling Saving State and Restoring Program Execution from a Checkpoint FIG. 4 illustrates a method of modifying code to enable restoring operation of a program from a checkpoint, according to some embodiments. As discussed above, the techniques described herein advantageously can be incorporated into a program automatically without manual coding by a programmer. A program translation tool such as a compiler can modify existing code to enable restoring operation of a program from a checkpoint. For example, in step 402, a compiler or other program translation tool can receive program code that includes code defining one or more functions. The program code can be designed to perform any suitable operation, as the techniques described herein are not limited as to the type of operation performed by the program. As an example, the program code may include code defining functions F and G, as discussed above. In step 404, the code for executing functions F and G is modified to enable the program to restore execution from a checkpoint. For example, the compiler or other program translation tool can insert helper code 102, function preamble 104, call site label code 108, and function epilogue 110, as discussed above. Checkpoint opportunities can also be inserted at suitable locations within the code for saving data. The functional code 106 can be modified to make use of the data structure for storing local variables defined in helper code 102. If a compiler is used to perform method 400, the result produced can be object code that is configured to perform functions F and G, with the additional capability of enabling restoring the execution of functions F and G from a checkpoint when an interruption occurs.

V. Applications

The techniques described herein can provide fault tolerance and failover schemes which can be very significant for programs with long execution times. This is due to the increased cost of lost work as the size of the computation grows. These techniques can also be very useful for distributed programs that make use of large computing resources, as the likelihood of failure is higher when more hardware is used to perform the computation. Trends in new computing hardware have shifted from a paradigm in which each successive generation of hardware is exponentially faster to one in which each successive generation has exponentially more computational cores. The techniques described herein can be used to enable performing large amounts of computational work using multithreaded programs running on multiple computational cores, or a cluster of machines. For example, such techniques can be used in a cloud computing environment in which multiple machines and/or multiple cores are involved in processing program data.

An advantage of the techniques described herein is that a program can be started on one processor/machine and then processing can continue on another processor/machine when a crash or other failure occurs. If one processor or machine fails, processing can resume on another processor or machine with minimal interruption. Since the techniques described herein do not require the cooperation of the operating system, processing could continue on a processor/machine that is running a different operating system, in some embodiments. The program can run on a different operating system if a suitable version is compiled on the new architecture and the file format for checkpoints is portable across architectures.

Figure 5:
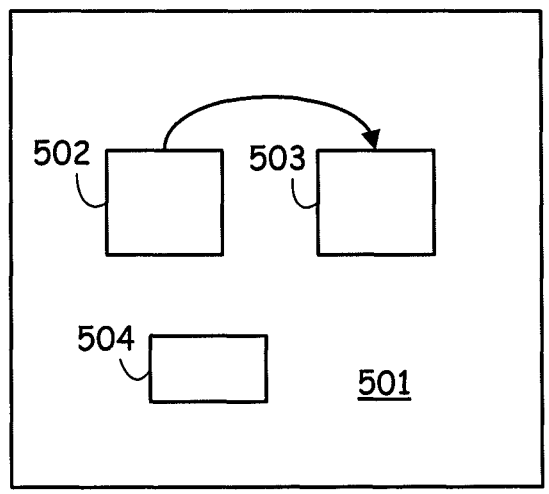
FIG. 5 shows an example of a computing device having a plurality of microprocessors on which the techniques described herein can be implemented.

FIG. 5 shows an example of a computing device 501 having a plurality of microprocessors 502 and 503. An entire program or a program thread may be running on microprocessor 502 when a crash or other failure occurs that interrupts execution. Using the techniques described herein, the program or program thread can continue execution of the program on microprocessor 503 using data stored in persistent storage 504 representing the state of execution of the program.

Figure 6:
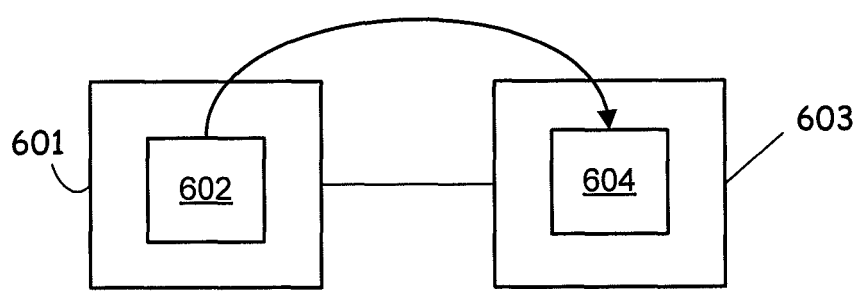
FIG. 6 shows an example of a computing environment that includes computing devices on which the techniques described herein can be implemented.

FIG. 6 shows an example of a computing environment that includes computing device 601 having microprocessor 602 and computing device 603 having microprocessor 604. A program or program thread may be running on microprocessor 602 when a crash or other failure occurs that interrupts execution. Using the techniques described herein, the program or program thread can continue execution of the program on microprocessor 604 of device 603. Devices 601 and 603 may be connected by any suitable communication connection. Devices 501, 601 and 603 may be any suitable computing devices such as general purpose computers, or other devices described herein, for example.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement various embodiments of the invention. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
    receiving first computer readable instructions configured to control a microprocessor to perform one or more operations, the first computer readable instructions having a plurality of functions;
    using a microprocessor, generating second computer readable instructions based on the first computer readable instructions, the second computer readable instructions being configured to perform the one or more operations and to resume execution of a function in the plurality of functions, the function comprising at least a first line of code, a second line of code that is subsequent to the first line of code and a third line of code subsequent to the second line of code, from a checkpoint corresponding to the second line of code without executing the first line of code by
    calling the function;
        loading data for use by the function, the data having been saved at the checkpoint during a prior execution of the function; and
        skipping over the first line of code and to the second line of code of the function, the second line of code being in execution at the checkpoint during the prior execution of the function.

2. The method of claim 1, wherein the method is performed by a compiler that compiles source code comprising the first computer readable instructions into object code comprising the second computer readable instructions.

3. The method of claim 1, wherein the second computer readable instructions are additionally configured to save data used by the function.

4. The method of claim 1, wherein the second computer readable instructions are additionally configured to track a program stack of a program comprising the function.

5. The method of claim 1, wherein the second computer readable instructions are configured to resume execution of the function from the checkpoint in a manner that is independent of an operating system running on a device that executes the second computer readable instructions.

6. A computer readable storage medium having stored thereon instructions, which when executed, perform a method, comprising:
    receiving first computer readable instructions configured to control a microprocessor to perform one or more operations, the first computer readable instructions having a plurality of functions;
    using a microprocessor, generating second computer readable instructions based on the first computer readable instructions, the second computer readable instructions being configured to perform the one or more operations, to track a program stack of a program comprising a function comprising at least a first line of code, a second line of code that is subsequent to the first line of code and a third line of code subsequent to the second line of code, and to resume execution of the function in the plurality of functions from a checkpoint corresponding to the second line of code without executing the first line of code by
    calling the function;
        loading data for use by the function, the data having been saved at the checkpoint during a prior execution of the function; and
        skipping over the first line of code to the second line of code of the function, the second line of code being in execution at the checkpoint during the prior execution of the function.

7. The computer readable storage medium of claim 6, wherein the method is performed by a compiler that compiles source code comprising the first computer readable instructions into object code comprising the second computer readable instructions.

8. The computer readable storage medium of claim 6, wherein,
    the second computer readable instructions are additionally configured to save data used by the function.

9. The computer readable storage medium of claim 6, wherein the second computer readable instructions are additionally configured to define a data structure for saving data used by the function.

10. The computer readable storage medium of claim 6, wherein the second computer readable instructions are configured to resume execution of the function from the checkpoint in a manner that is independent of an operating system running on a device that executes the second computer readable instructions.

11. A system comprising:
    a computer readable storage medium having stored thereon computer readable instructions configured to resume execution of a function comprising at least a first line of code, a second line of code that is subsequent to the first line of code and a third line of code subsequent to the second line of code from a checkpoint corresponding to the second line of code without executing the first line of code by
    calling the function;
        loading data for use by the function, the data having been saved at the checkpoint during a prior execution of the function;
        skipping over the first line of code to the second line of code of the function, the second line of code being in execution at the checkpoint during the prior execution of the function;
        saving data used by the function; and
        tracking a program stack of a program comprising the function;
        wherein the computer readable instructions are based upon an earlier version of the computer readable instructions and
    at least one microprocessor configured to execute the computer readable instructions.

12. The system of claim 11, wherein the at least one microprocessor comprises a first microprocessor and second microprocessor.

13. The system of claim 11, wherein the first microprocessor executes the function, and, when execution of the function using the first microprocessor is interrupted, execution of the function continues from the checkpoint using the second microprocessor.

14. The system of claim 13, wherein the system comprises:
   a first device comprising the first microprocessor; and
   a second device comprising the second microprocessor.

15. The system of claim 14, wherein the first device runs a first operating system and the second device runs a second operating system different from the first operating system.

16. The system of claim 11, further comprising computer readable instructions for determining whether to save the data at the checkpoint.

17. The system of claim 11, wherein a subset of the computer readable instructions define a data structure for saving the data used by the function.

18. The system of claim 11, wherein a subset of the computer readable instructions indicate a location within the function where one or more function calls are made to one or more other functions.

19. The system of claim 11, wherein the computer readable instructions are configured to resume execution of the function from the checkpoint in a manner that is independent of an operating system running on a device that executes the computer readable instructions.

20. The system of claim 11, wherein the computer readable instructions are object code generated by a compiler.

* * * * *